(12) United States Patent
Haas et al.

(10) Patent No.: US 8,159,167 B2
(45) Date of Patent: Apr. 17, 2012

(54) ELECTRONICALLY COMMUTATED MOTOR

(75) Inventors: Benjamin Haas, St. Georgen (DE); Frank Heller, Königsfeld-Burgberg (DE)

(73) Assignee: EBM-Papst St. Georgen GmbH & Co. KG, St. Georgen (DE)

( * ) Notice: Subject to any disclaimer, the term of this patent is extended or adjusted under 35 U.S.C. 154(b) by 393 days.

(21) Appl. No.: 12/361,551

(22) Filed: Jan. 29, 2009

(65) Prior Publication Data

US 2009/0256508 A1 Oct. 15, 2009

(30) Foreign Application Priority Data

Jan. 29, 2008 (DE) .................. 10 2008 008 080

(51) Int. Cl.
*H02P 6/00* (2006.01)

(52) U.S. Cl. .................. 318/400.29; 318/294

(58) Field of Classification Search .......... 318/293, 318/400.01–400.35

See application file for complete search history.

(56) References Cited

U.S. PATENT DOCUMENTS

| | | | |
|---|---|---|---|
| 5,822,706 A | 10/1998 | Pfeufer et al. ............ 701/29 |
| 5,995,885 A | 11/1999 | Pfeufer et al. ............ 701/29 |
| 6,066,930 A * | 5/2000 | Horiguchi et al. ....... 318/400.29 |
| 6,580,974 B2 | 6/2003 | Haag et al. ............... 701/1 |
| 7,418,316 B2 | 8/2008 | Pfeufer et al. ............ 701/1 |
| 2004/0051489 A1* | 3/2004 | Berroth et al. ........... 318/439 |
| 2004/0056617 A1* | 3/2004 | Berroth et al. ........... 318/439 |
| 2005/0218843 A1* | 10/2005 | Chen et al. ............... 318/254 |
| 2006/0267531 A1* | 11/2006 | Hahn ....................... 318/439 |
| 2007/0189739 A1* | 8/2007 | Dufner et al. ............ 388/801 |
| 2008/0265811 A1 | 10/2008 | Brannen et al. .......... 318/272 |

FOREIGN PATENT DOCUMENTS

| | | |
|---|---|---|
| DE | 38 31 633 A | 3/1990 |
| DE | 42 09 474 A | 9/1993 |
| DE | 199 35 048 A1 | 2/2001 |
| EP | 1 073 192 B1 | 1/2001 |

OTHER PUBLICATIONS

Microchip, PIC16F616/16HV616 Microcontrollers-DS41288A, © 2006, pp. 1-172.
Micronas GmbH, HAL501 . . . Hall Effect Sensor Family-6251-485-4DS, Nov. 27, 2003.

* cited by examiner

*Primary Examiner* — Bentsu Ro
*Assistant Examiner* — Jorge Carrasquillo
(74) *Attorney, Agent, or Firm* — Milton Oliver, Esq.; Oliver Intellectual Property LLC

(57) ABSTRACT

An electronically commutated motor (20) has a rotor (28) and a rotor position sensor (30), which sensor, during operation, furnishes a rotational position signal (34). A stator interacts with the rotor (28). The stator has a stator winding strand (26) in an H bridge (22), and a control apparatus (36) which, during operation, performs the steps of: (A) controlling the H bridge (22) so that current pulses (+i1, −i1) flow through the stator winding strand (26), in alternate directions, each pulse starting at a first point in time (t1); (B) at the beginning of each commutation, starting from a second point in time (t2), operating in short circuit the winding strand (26), in order to cause a decreasing loop current (I*) through the stator winding strand (26), which loop current (I*) reaches zero at a third point in time (t3); and (C) stepwise modifying, toward a minimum, the time interval (TCC) between the first and third points in time (t1, t3).

22 Claims, 9 Drawing Sheets

US 8,159,167 B2

ELECTRONICALLY COMMUTATED MOTOR

CROSS-REFERENCE TO RELATED APPLICATION(S)

This US application claims priority from our German application DE 10 2008 008 080.2, filed 29 Jan. 2008, the disclosure of which is hereby incorporated by reference.

FIELD OF THE INVENTION

The invention relates to an electronically commutated motor which dynamically adapts to changing conditions such as load or voltage.

BACKGROUND

A variety of designs for electronically commutated motors may be distinguished. They can have a different number n of winding strands, n usually being in the range from 1 to 6.

The current pulses that flow in these winding strands during operation are either unidirectional, or are current pulses whose direction is switched over, by means of a so-called "commutation," twice in the course of one rotor rotation of approximately 360° el.

Because substantial currents can flow in such a motor, an attempt is made to extend the commutation, in the form of a commutation operation, over a certain time span so that during that time span the motor operates with good efficiency, i.e. without losses. This means that it would be desirable for the energy stored in the relevant winding strand, prior to switchover of the current direction, to be utilized as completely as possible for driving the motor.

SUMMARY OF THE INVENTION

It is therefore an object of the invention to make available a novel, dynamically adapting electronically commutated motor.

This object is achieved, according to the invention, by a motor utilizing an algorithm in which the control apparatus controls an H bridge (22) so that current pulses (+i1, −i1) flow through the stator winding strand (26), in alternate directions, each pulse starting at a first point in time (t1); at the beginning of each commutation, starting from a second point in time (t2), operating in short circuit the winding strand (26), in order to cause a decreasing loop current (I*) through the stator winding strand (26), which loop current (I*) reaches zero at a third point in time (t3); and stepwise modifying, toward a minimum, the time interval (TCC) between the first and third points in time (t1, t3). In such a motor, the second point in time is variable, and is automatically modified while the motor is running, depending on external conditions such as the instantaneous operating voltage of the motor, the instantaneous motor load, etc., in such a way that the commutation operation proceeds favorably and at close to its efficiency optimum. In the case of driving a fan, for example, when the air pressure changes, the motor's commutation operation can be automatically adapted to the new air pressure.

This is important because without the current looping operation, the magnetic energy stored in the winding strand during the commutation operation would need to be stored briefly in a so-called link circuit capacitor and delivered back to the motor from that link circuit capacitor directly afterward. This means that a reciprocating current would be constantly flowing to/from this capacitor; this reduces the service life of the capacitor and requires the use of a large capacitor, for which there is no room in many modern motors because of their compact design.

BRIEF FIGURE DESCRIPTION

Further details and advantageous refinements of the invention are evident from the exemplifying embodiments, in no way to be understood as a limitation of the invention, that are described below and depicted in the drawings.

DETAILED DESCRIPTION OF A PREFERRED EMBODIMENT

Figure 1:
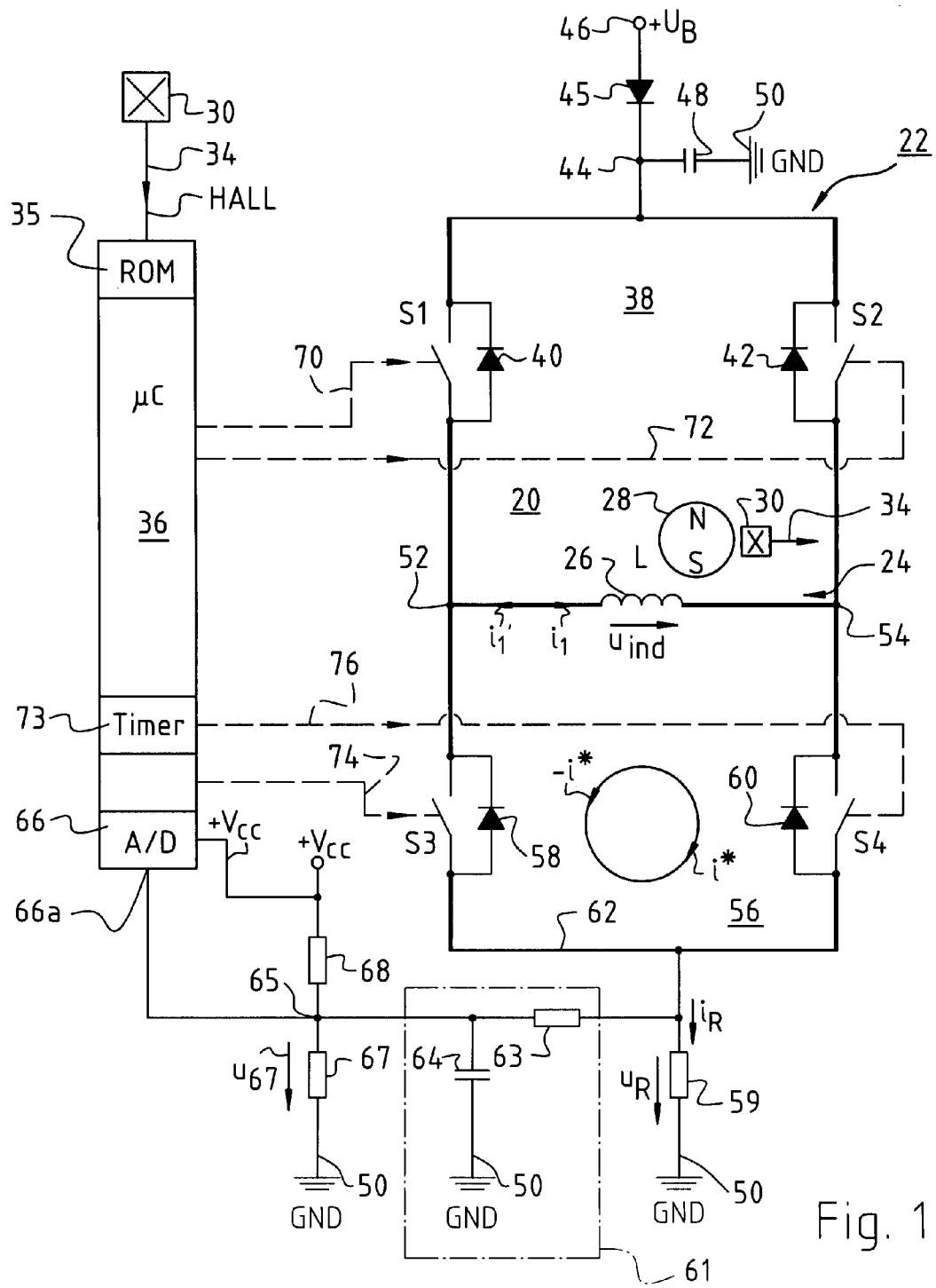
FIG. 1 is a highly schematic circuit diagram to explain the invention.

FIG. 1 is a highly schematic depiction of the basic structure of a two-pulse, single-strand, electronically commutated motor 20 whose single winding strand 26 is operated from an H bridge 22 whose H-shaped basic structure is emphasized using heavier lines, in order to facilitate comprehension.

In a transverse branch 24, which can also be referred to as the diagonal of H bridge 22, motor 20 has, in its stator, winding strand 26 having an inductance L. Said strand interacts with a schematically depicted permanent-magnet rotor 28 that, depending on design, can take any number of forms, for example internal rotor, external rotor, flat rotor, etc., and can have a variety of pole numbers, e.g. two poles (as depicted), four, six, eight poles, etc.

A rotor position sensor 30, which is depicted twice in FIG. 1 and is usually a Hall sensor, is controlled by the magnetic field of rotor 28. The output signal "HALL" of sensor 30 is delivered via a lead 34 to a microcontroller (µC) 36, and supplies the latter with information about the instantaneous rotational position of rotor 28.

H bridge 22 has an upper bridge half 38 in which a semiconductor switch S1 is provided at the left and a semiconductor switch S2 at the right. A recovery diode 40 is connected in antiparallel with S1, and a recovery diode 42 in antiparallel with S2, the cathodes of which diodes are connected via a connecting lead 44 and a diode 45 to positive pole 46 of a voltage source UB. Connecting lead 44 constitutes the positive part of a so-called DC link circuit whose negative part is constituted by ground 50. Attached between ground 50 and the cathode of diode 45 is a capacitor 48 that is referred to as link circuit capacitor 48 and that serves in certain situations to briefly receive and store a recharge current from motor 20 and, immediately thereafter, to deliver the stored energy back to motor 20; this is explained in further detail below.

The result is that, during operation, there flows, between motor 20 and capacitor 48, a current, in alternating directions, whose frequency depends on the rotation speed of motor 20 and whose level should be as low as possible, since this reciprocating current results in beating of the capacitor and thus shortens its service life, and therefore also shortens the service life of the motor.

The anode of diode 40 is connected to a node 52, and that of diode 42 is connected to a node 54. Stator winding strand 26 is arranged between nodes 52, 54.

H bridge 22 also has a lower bridge half 56 in which a semiconductor switch S3 is provided at the left and a semiconductor switch S4 at the right. A recovery diode 58 is connected in antiparallel with S3, and a recovery diode 60 in antiparallel with S4. The cathode of diode 58 is connected to a node 52, and that of diode 60 to node 54. The anodes of diodes 58, 60 are connected via a connecting lead 62 and a low-impedance measuring resistor 59 to ground 50. A voltage uR occurs at measuring resistor 59 during operation, and that voltage is delivered, via a passive low-pass filter 61, e.g. constituted by a resistor 63 and a capacitor 64, to input 66a of an A/D (analog-to-digital) converter 66, for example in µC 36, where it is converted into a digital value.

Because A/D converter 66 can process only positive signals, but voltage uR at measuring resistor 59 can also become negative during operation, that voltage uR is shifted electrically in a positive direction. For that purpose, the output of low-pass filter 61 is connected to a node 65 that is connected via a resistor 67 to ground 50 and via a resistor 68 to a regulated voltage +VCC, to which µC 36 is also connected.

EXAMPLE

In an experimental setup, the following values were used for the components:

| Motor 20 for fan drive | |
|---|---|
| Operating voltage | 48 V |
| Power consumption | 18 W |
| VCC | +5 V |
| Resistor 59 | 0.62 ohm |
| Resistors 63, 67 | 1 kilohm |
| Resistor 68 | 4 kilohm |
| Capacitor 64 | 1 nF |
| µC 36 | PIC16F616 of Microchip Technology Inc. |
| Sensor 30 | 505SF-K of Micronas GmbH, Freiburg, Germany |
| Capacitor 48 | 100 µF, 100 V |

The PIC16F616 is a 14-pin 8-bit CMOS microcontroller having an integrated analog-to-digital converter (ADC) module but other suitable microcontrollers are known to those of ordinary skill in the art.

These values of course depend on the operating voltage and on the output of motor 20, and serve merely to explain an exemplary embodiment.

Figure 8:
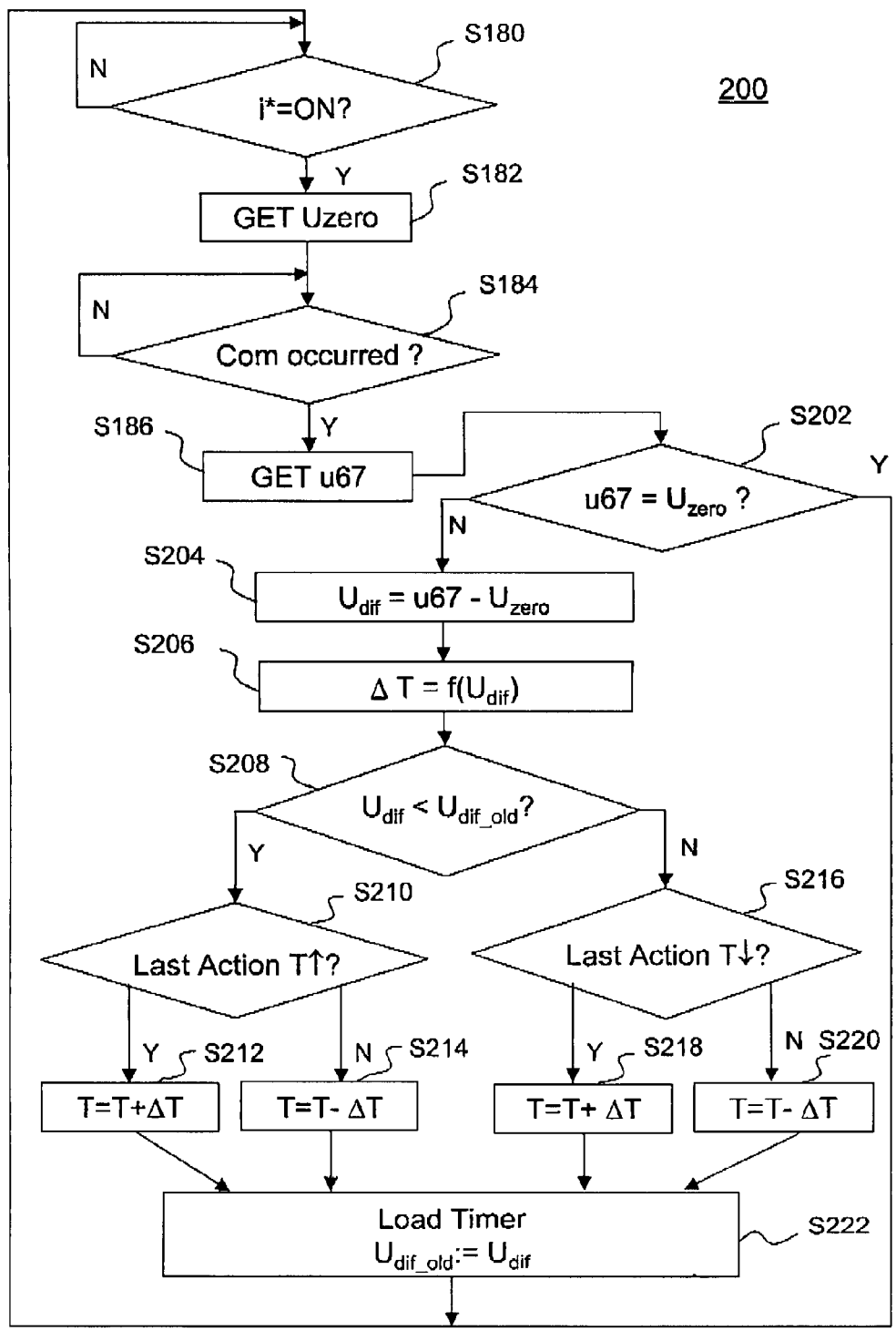
FIG. 8 is a flowchart of an algorithm to optimize the commutation operation by means of an adaptive regulation operation that is carried out repeatedly as the motor is running.
Figure 9:
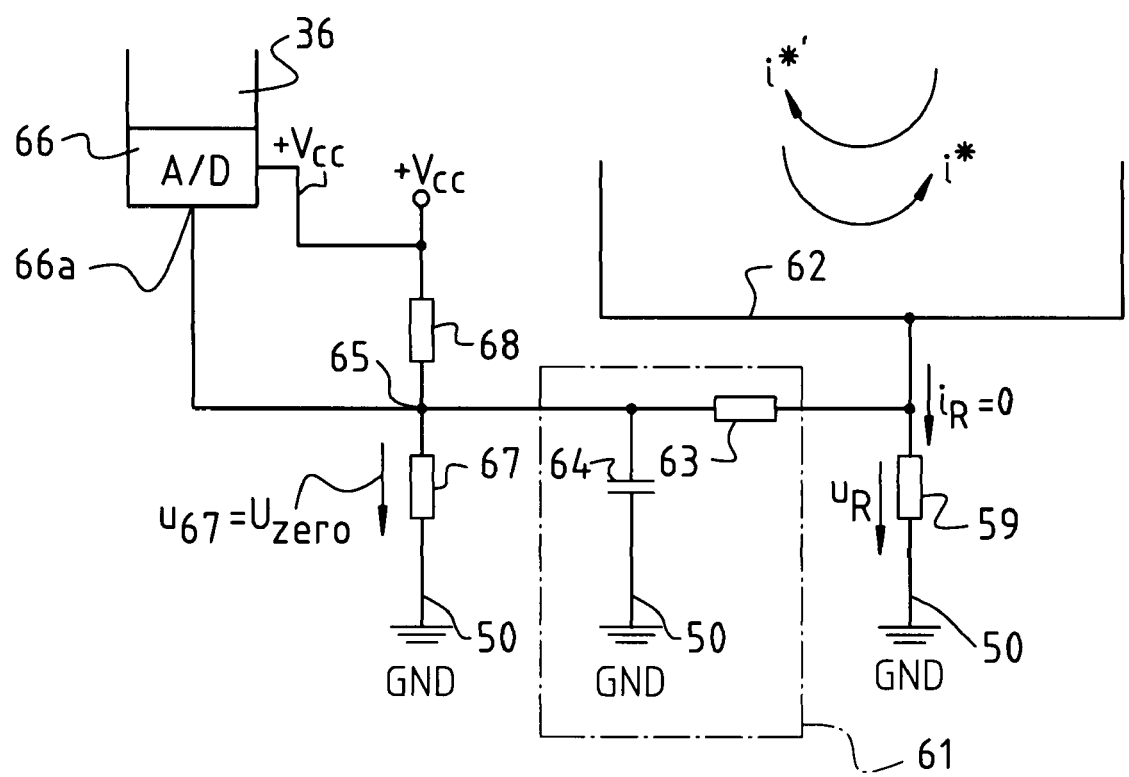
FIG. 9 is a circuit diagram analogous to FIG. 1, to explain a detail.

FIG. 9 is an excerpt from FIG. 1, to explain the voltage reference value Uzero that is used in the flowchart of FIG. 8.

Uzero is measured when a loop current I* is flowing, which can occur either clockwise or counter-clockwise. In both cases, the two upper semiconductor switches S1 and S2 in FIG. 1 are nonconductive, and the two lower semiconductor switches S3 and S4 are conductive. As a result, a loop current I* or I*' flows, during the commutation operation, through stator strand 26 and through the two lower semiconductor switches S3 and S4 or their diodes 58 or 60. Because the two upper semiconductor switches S1 and S2 are nonconductive, no current iR can flow through resistor 59 to or from motor 20, so that voltage u67 at resistor 67, i.e. the input voltage of A/D converter 66, has the value Uzero, i.e. the value corresponding to a current iR=0. This value Uzero represents, in FIG. 9, a reference voltage to which voltage changes are referred. For the component values indicated above, Uzero has a value of approximately +1 V. This enables the digitization of voltages uR that can be either positive or (in certain cases) negative, and, as a result of the arrangement with resistors 63, 67, 68, that these voltage values are shifted into a positive region in which digitization by A/D converter 66 is possible.

Semiconductor switches S1 to S4 are controlled via control connections 70, 72, 74, 76 by µC 36. The latter requires, for this purpose, information about the instantaneous rotor position, which information it obtains via the HALL signal and, if applicable, in other ways, e.g. by way of other kinds of sensors, using the so-called sensorless method, or in some other manner. This is explained below.

The switchover generally takes place shortly before the change in the HALL signal, by way of a so-called early commutation that is usually referred to in technical jargon as "ignition advance" or time-advanced commutation.

Operation

During operation the two semiconductor switches S1 and S4 are made conductive first, for example (depending on the rotational position of rotor 28), so that a current pulse i1 flows from terminal 46 through diode 45, semiconductor switch S1, node 52, winding strand 26, node 54, semiconductor switch S4, and measuring resistor 59 to ground 50.

This current pulse i1 is followed by a commutation operation, at the beginning of which external energy delivery to motor 20 is interrupted by (in this example) making S1 nonconductive. This operation is described in detail below.

When current i1 is no longer flowing in winding strand 26 at the end of the commutation operation, S4 is also made nonconductive and semiconductor switches S2 and S3 are made conductive, so that a current pulse i1' now flows from terminal 46 through diode 45, semiconductor switch S2, node 54, strand 26, node 52, switch S3, and measuring resistor 59 to ground 50.

Semiconductor switch S4 thus becomes blocked subsequent to commutation, ideally when loop current I* has just reached a value of zero, and semiconductor switch S2 is switched on so that a current pulse i1' now flows.

Simultaneously therewith, analog voltage u67 is measured by A/D converter 66 as a digital value, thereby indirectly sensing the level of the voltage at measuring resistor 59.

When motor 20 is being optimally regulated, this voltage u67 likewise has the reference value Uzero when measured directly after commutation, i.e. in this case commutation is working ideally and does not need to be modified. Motor 20 is operating with very good efficiency, and the current to link circuit capacitor 48 becomes very low, so that it does not heat up and its service life is long.

If, however, commutation is not yet (or no longer) adjusted optimally, for example because voltage UB has changed, then voltage uR becomes briefly negative during commutation and voltage u67 accordingly becomes less than Uzero, which is why corrections are made as described below with reference to the flow chart of FIG. 8. Motor 20 is thereby continuously and dynamically optimized.

The following pattern therefore results:

S1, S4 conductive; S2, S3 nonconductive-> current flows through winding strand 26 in one direction.

S3, S4 conductive; S1, S2 nonconductive-> current loops in lower part 56 of H bridge 22.

S2, S3 conductive, S1, S4 nonconductive-> current flows through winding strand 26 in the other direction.

S3, S4 conductive, S1, S2 nonconductive-> current loops in lower part 56 of H bridge 22.

Figure 2:
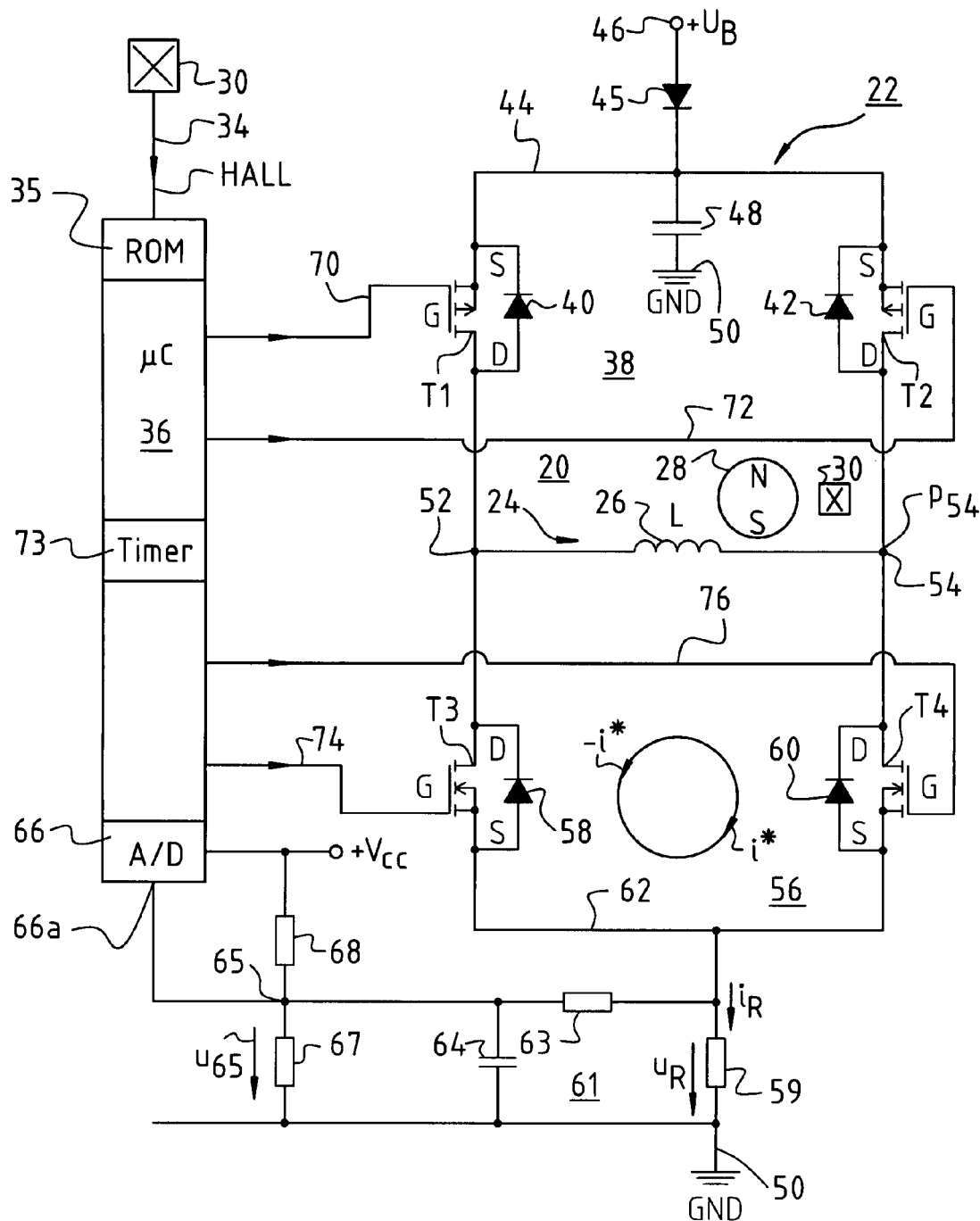
FIG. 2 is a circuit diagram analogous to FIG. 1.

FIG. 2 shows an example of the implementation of H bridge 22 using MOSFETs (Metal Oxide Semiconductor Field Effect Transistors). Parts identical, or functionally identical, to those in FIG. 1 have the same reference characters as therein, and usually are not described again.

Instead of semiconductor switch S1 of FIG. 1, what is provided here is a p-channel MOSFET T1 whose source S is connected to positive terminal 44 of the link circuit, and whose gate G is controlled by μC 36 via lead 70. Recovery diode 40 is connected in antiparallel with MOSFET T1. In many cases a recovery diode of this kind is already present in the MOSFET as a so-called "parasitic" recovery diode. If not, it can be implemented as a separate component.

Similarly, instead of semiconductor switch S2 of FIG. 1, a p-channel MOSFET T2 is present that is connected in antiparallel with recovery diode 42. Transistor T2 is controlled by μC 36 via lead 72.

Provided in FIG. 2 instead of semiconductor switch S3 of FIG. 1 is an n-channel MOSFET T3 with which recovery diode 58 is connected in antiparallel. Its source S is connected to lead 62, and its drain (like that of transistor T1) is connected to node 52. T3 is controlled by μC 36 via a lead 74.

In the same manner, instead of semiconductor switch 54 of FIG. 1 an n-channel MOSFET T4 is provided, with which recovery diode 60 is connected in antiparallel. Its drain D, like drain D of semiconductor switch T2, is connected to node 54. MOSFET T4 is controlled by μC 36 via control lead 76.

As a comparison of FIGS. 1 and 2 shows, current measuring resistor 59 and the parts connected to it are implemented in the same way as in FIG. 1, and will therefore not be described again.

Reference is made to the following figures for an explanation of the manner of operation of FIG. 2.

Figure 3:
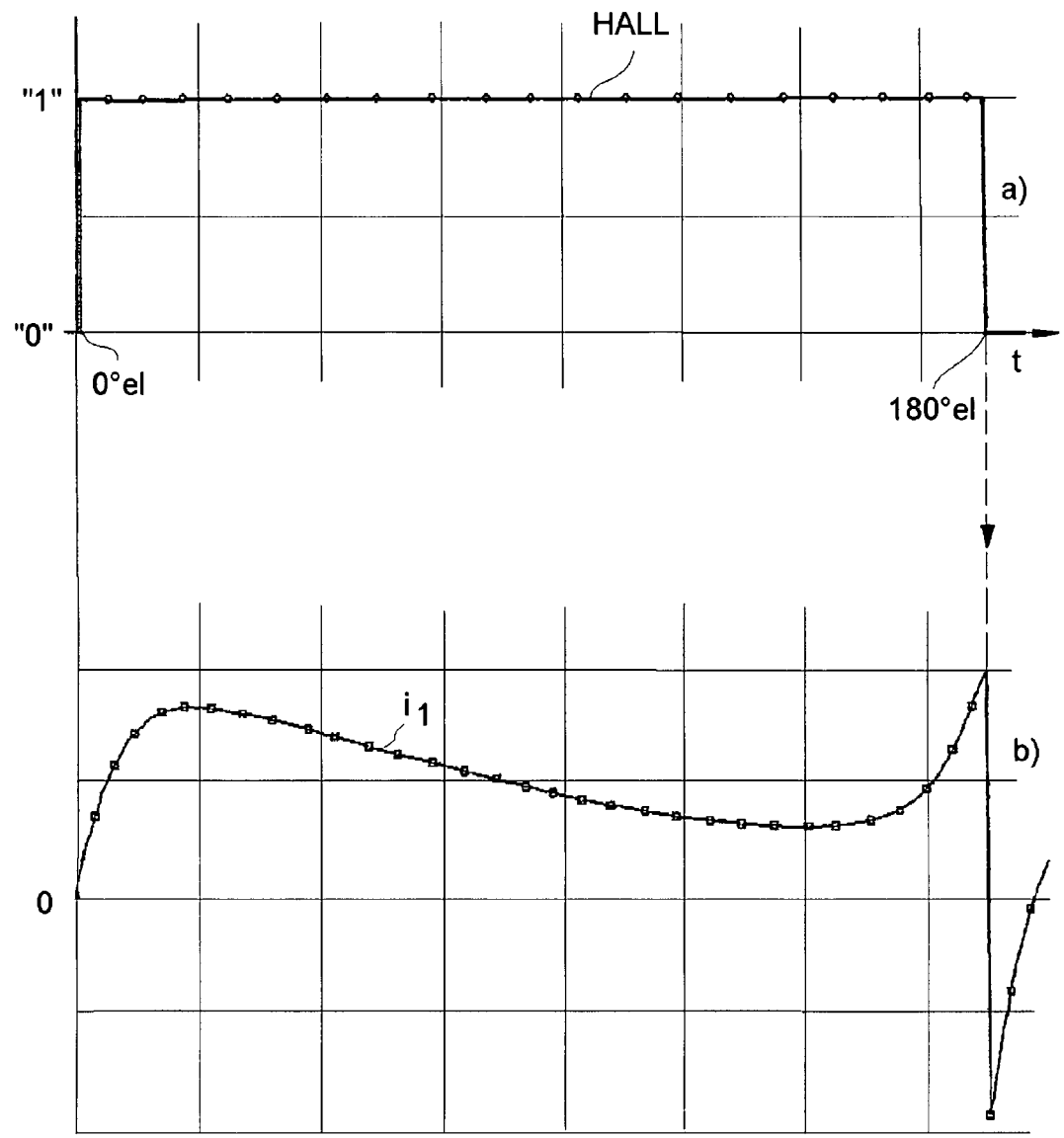
FIG. 3 shows the execution sequence of a commutation operation, in which the latter is controlled by the signal of a rotor position sensor having a digital output signal.

FIG. 3 shows, for didactic reasons (i.e. merely to facilitate understanding) an antiquated form of commutation. Output signal 34 of rotor position sensor 30, which signal is labeled "HALL," is shown at the top. This signal has a value of "1" during 180° el. of the rotation of rotor 28, and a value "0" during the next 180° el.; and this alternating value sequence of 0-1-0-1-0 . . . continuously repeats. Transitions are located between these values, i.e. at 0° el. this "0" signal goes to "1", and at 180° el. it goes from "1" to "0". These transitions control transistors T1 to T4 in FIG. 2.

For example, when HALL="0" the two transistors T1 and T4 may be conductive, and in that case transistors T2 and T3 are nonconductive, since obviously a short circuit would otherwise occur in H bridge 22.

Because of this risk of a short circuit, at the transition from HALL="0" to HALL="1" firstly all four transistors are blocked briefly (e.g. for 30 (mu)s), and then transistors T2 and T3 are made conductive and transistors T1 and T4 remain nonconductive.

Upon blockage of the two transistors T1 and T4, considerable magnetic energy w is stored in winding strand 26, namely $$W=0.5*L*i^2 \tag{1},$$

where

L=inductance of winding strand 26 and

I=current in strand 26 at the moment transistor T1 is blocked.

This energy is stored in link circuit capacitor 48, which must therefore be very large in this case. This is undesirable because there is no space in a motor for such a large electrical component, and because the substantial low-frequency alternating currents that flow through such a capacitor 48 heat it up considerably and shorten its service life. When capacitor 48 fails, the motor is defective and usually must be replaced.

It is therefore desirable for this so-called recharge current (also called a return current or ripple current) that flows to capacitor 48 to be kept as low as possible and to have a value on the order of zero, since the service life of motor 20 is thereby automatically lengthened.

Figure 4:
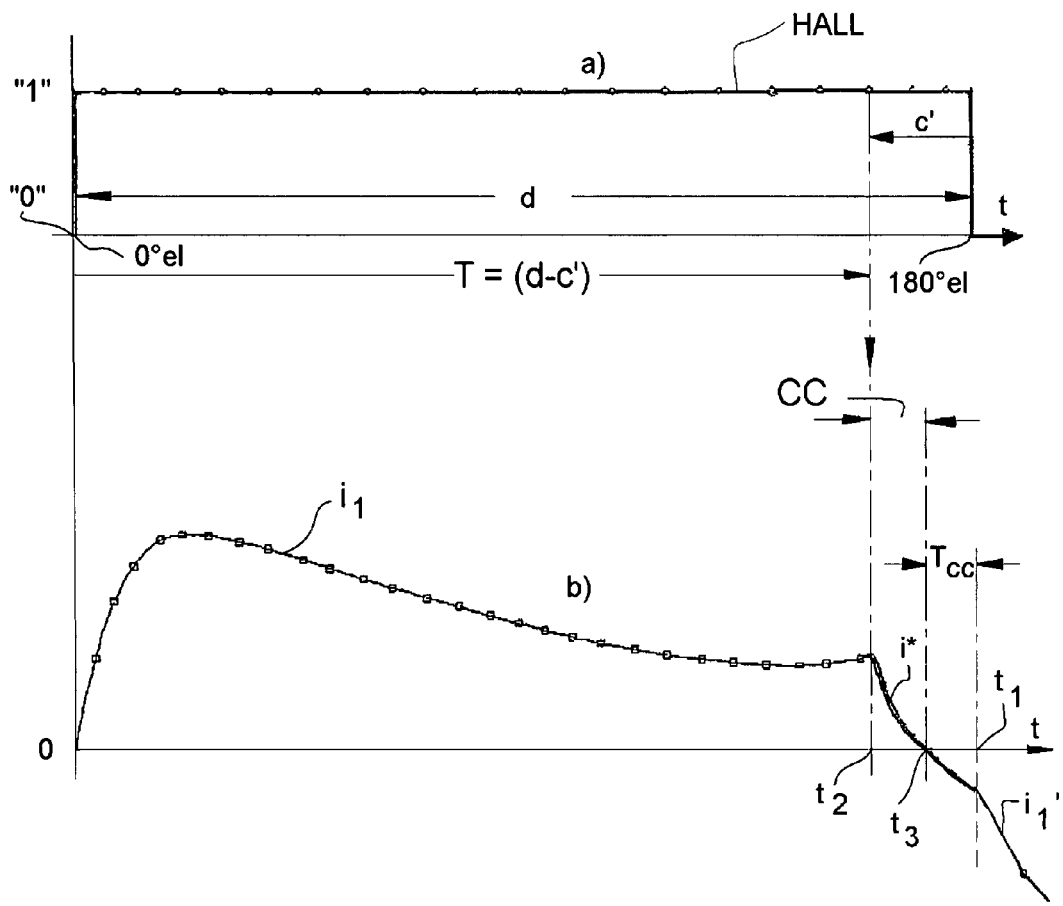
FIG. 4 shows a commutation operation in which the magnetic energy stored during commutation in the winding strand that is to be shut off is reduced by generating a short-circuit current in that winding strand by current looping, said current contributing to the driving of rotor 28 but not, in this case, in an optimized manner.

FIG. 4 shows a known method with which the recharge current can be reduced. The Hall signal HALL is once again depicted at the top. For this signal, the time interval d between two signal changes is measured. When motor 20 is running at approximately a constant rotation speed, this time interval d is largely constant, i.e. it can also be measured during one of the preceding revolutions.

An empirically ascertained constant c is subtracted from this value d to yield a time duration $$T=d-c' \tag{2},$$

and this time duration T is measured starting from a specific rotor position, e.g. from 0° el.; when it has elapsed, the upper transistor T1 or T2 that is conductive at that moment is made nonconductive, so that no further energy can be delivered to winding strand 26 from UB.

The lower transistor T3 or T4 that is conductive at that moment is not switched off, but remains conductive.

If, for example, the two transistors T1 and T4 were conductive at the end of time duration T, so that a current i1 flowed from node 52 through strand 26 to node 54, the current that previously flowed from terminal UB through transistor T1 to node 52 is therefore interrupted.

The current through winding strand 26 now continues to flow through the (still conductive) transistor T4 and through diode 5B, and it takes the form of a loop current I* by which rotor 28 continues to be driven; this loop current I* drops to zero within a time span CC (FIG. 4b) without causing a return current to flow to capacitor 48 (CC=current circulates). At time t3, loop current I* reaches a value of zero.

Subsequent to time t3, the electromagnetic energy stored in winding strand 26 is exhausted so that it can no longer generate a loop current; but motor 20 is now working as a generator, i.e. until time t1 a negative loop current through the (still short-circuited) winding strand 26 is generated by the rotating rotor 28 and the kinetic energy stored in it. This occurs as a result of the so-called induced voltage or back-EMF that is induced by permanent-magnet rotor 28 in winding strand 26.

This means that the (empirically ascertained) time span c' is too long in this case, and that time span TCC (see equation (4)) is likewise too long. This time span TCC should be as short as possible, and ideally should have a value of zero.

This is a consequence of the fact that the empirically ascertained value c' can only be an average, which of course does not represent an optimum for many operating states of motor 20. If, for example, motor 20 serves to drive a fan, simply opening or closing a window, in a room where the fan is installed, can cause the time durations CC and TCC to change considerably.

It is to be noted that the voltage induced in winding strand 16 during operation always works against current i1 in winding strand 16 and thereby decreases time span CC.

If time span c' is too long, the negative current therefore rises between times t3 and t1 as a result of the induced voltage. A negative voltage peak is therefore obtained, in this case, at measuring resistor 59, when commutation occurs at time t1 and voltage uR is measured there. A negative voltage peak of this kind at measuring resistor 59 therefore occurs when CC is too long, but also when CC is too short; in other words, this voltage peak indicates simply that c' does not have an optimal value, but does not indicate whether c' is too short or too long.

When first time t1 is reached in FIG. 1, this time being determined in this example by the change in the HALL signal from "1" to "0" (or vice versa), commutation then occurs, i.e. firstly transistor T4 is switched off and then, after about 30 μs (microseconds), the two transistors T2 and T3 are switched on, so that the current in winding strand 26 now flows from right to left, i.e. from node 54 to node 52.

If the time at which energy delivery to motor 20 is interrupted, so that loop current I* begins flowing, is designated in FIG. 4 as second time t2, and if the time at which loop current I*=0 is designated third time t3, then $$CC=t3-t2 \quad (3).$$

Analogously, for the duration TCC:

$$TCC=t1-t3 \quad (4).$$

Figure 5:
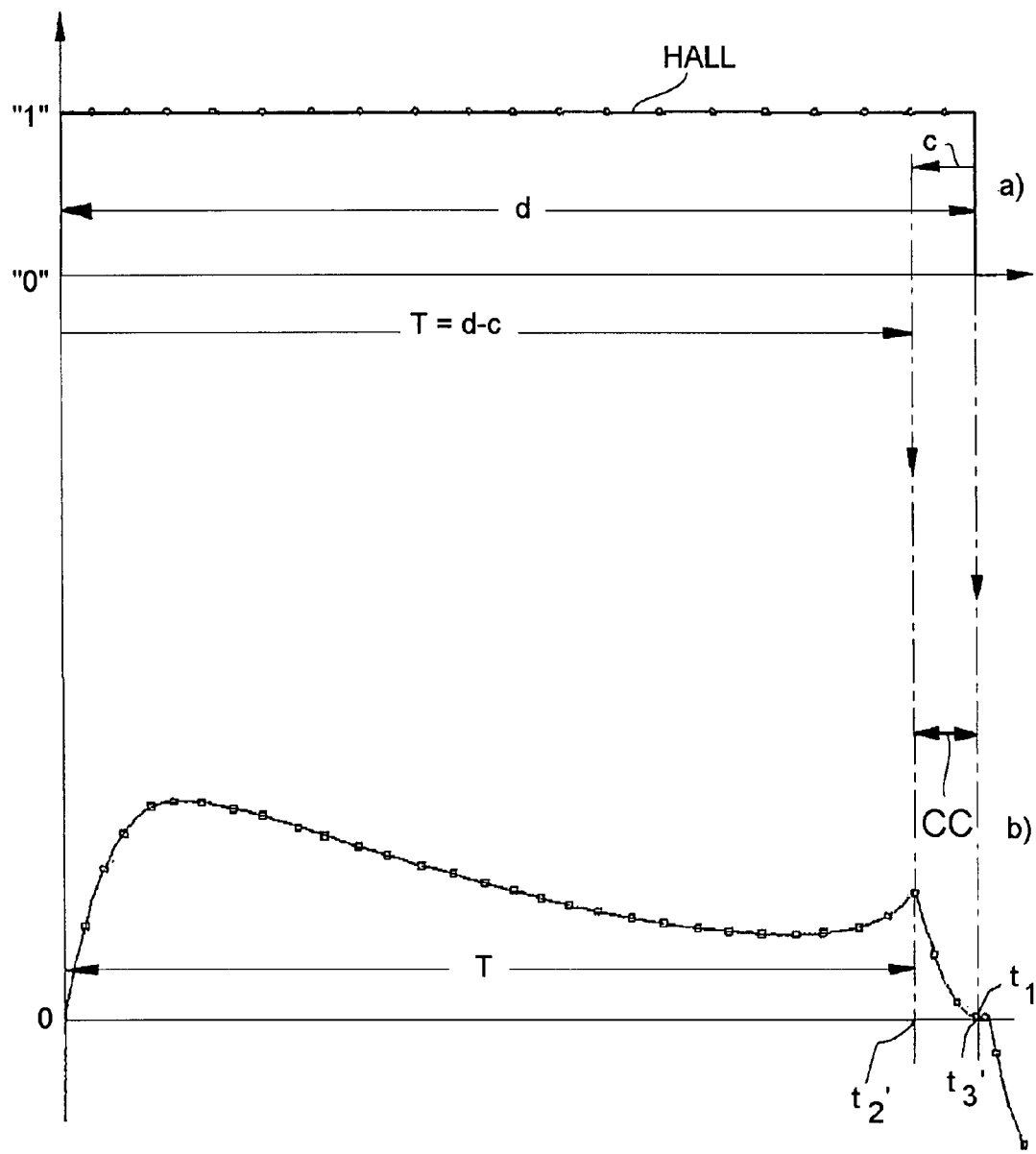
FIG. 5 shows a commutation operation analogous to FIG. 4, except that current looping is occurring in an optimized manner, in order to obtain a motor having a small physical size and good efficiency.

FIG. 5 shows, in a simulation, the result of these efforts. Note: only the right-hand part of each depiction is relevant.

Time span CC, during which a loop current I* flows, begins in FIG. 5 at a later second time t2' as compared with FIG. 4, and lasts until a later third time t3' that is located very close to first time t1, i.e. time span TCC (FIG. 4) has shrunk practically to zero. This is sufficient for a currentless commutation, since in this case transistors T1 to T4 of H bridge 22 switch over when no (or very little) current i1 is flowing; this is also referred to as wattless commutation, and increases the service life of the motor.

Figure 6:
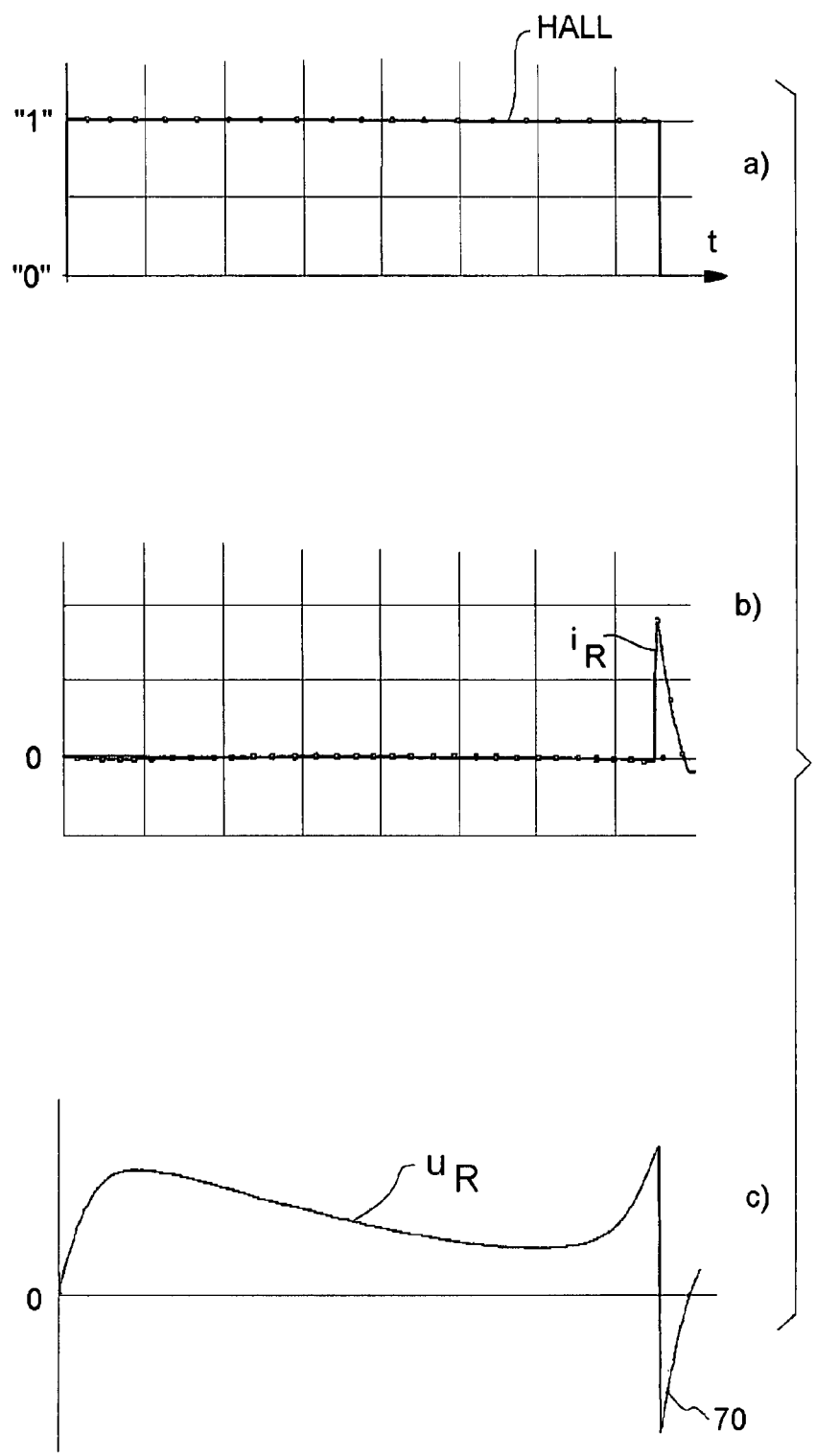
FIG. 6 is a set of graphs to explain the commutation operation in accordance with FIG. 3.

FIG. 6 shows signal profiles that occur in the context of (antiquated) commutation in accordance with FIG. 3.

In FIG. 3, current i1 in strand 26 is abruptly switched over to a current in the opposite direction, i.e. a loop current does not flow during the transition.

Because the current flowing through strand 26 cannot decay immediately because of inductance L of strand 26, the stored energy is fed back into capacitor 48.

FIG. 6a), like FIG. 3a), shows the signal of sensor 30.

FIG. 6b) shows current uR through measuring resistor 59, which current flows in this context into capacitor 48 and is briefly stored therein. Only when this current has become zero, it is possible to build up in strand 26 a current that generates a torque in that rotor position. The high current iR (FIG. 6b) reduces the service life of capacitor 48 and degrades the efficiency of motor 20.

FIG. 6c) shows voltage uR at measuring resistor 59. It is evident that, after the change in the HALL signal, a negative voltage pulse 70 occurs that would not be capable of being digitized with a normal A/D converter. This means that signal uR at resistor 59 must be shifted (offset) far enough in the positive direction that only positive voltages occur at input 66 of μC 36, so that voltage uR can be evaluated continuously.

Figure 7:
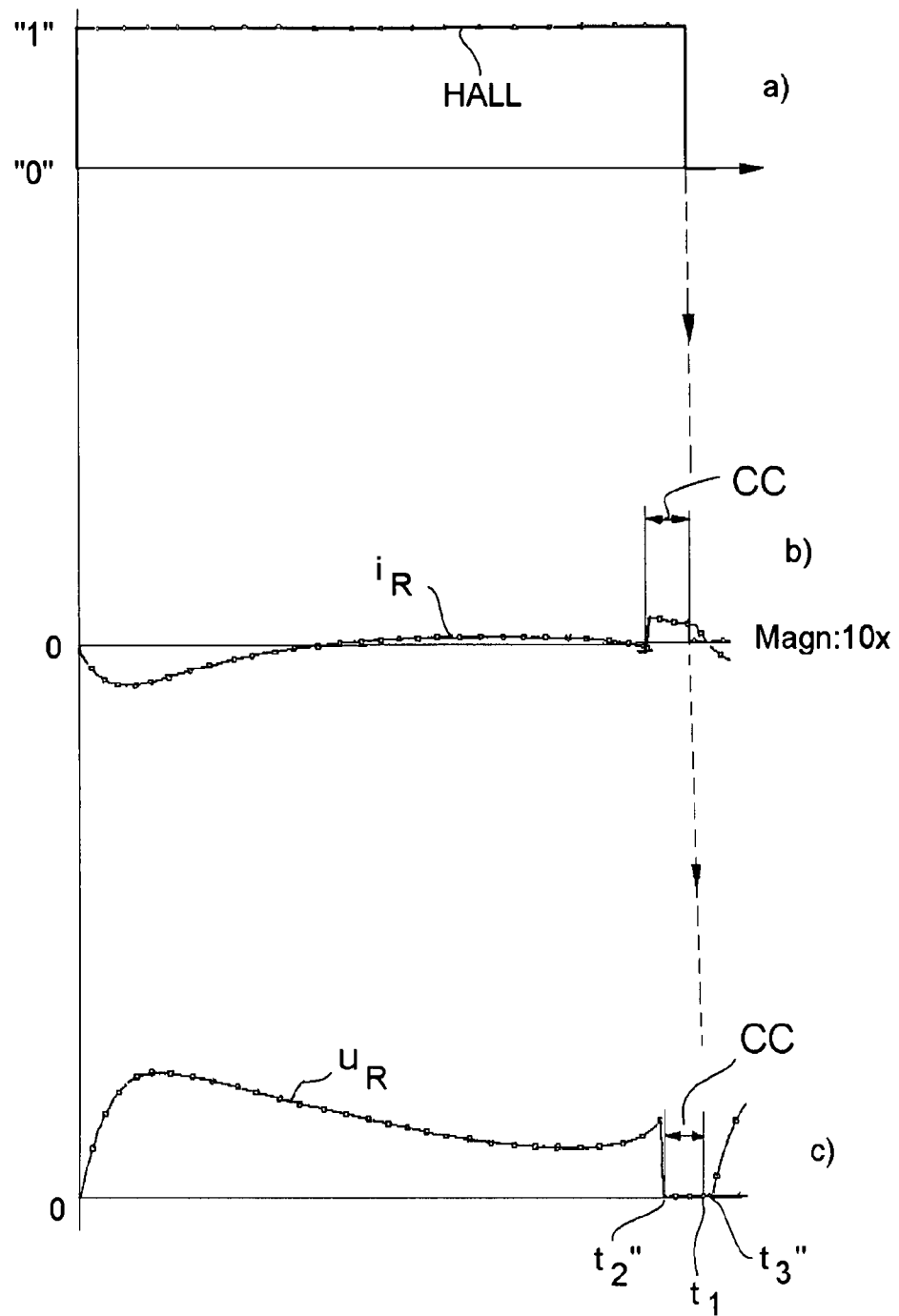
FIG. 7 is a set of graphs to explain the commutation operation in accordance with FIG. 4.

FIG. 7 is a graphical depiction analogous to FIG. 6, but with reference to the diagram according to FIG. 5, showing the signal profile for a motor having current loops ("CC"). Upon the switchover to the opposite current direction, such as that which occurs at time t1, no voltage or current peaks can occur, thanks to better management of the commutation operation.

By analogy with FIG. 6b), FIG. 7b) depicts a current iR that is caused by energy W stored in strand 26 and flows to capacitor 48. Because this current is extremely low, its amplitude is shown magnified by a factor of 10 as compared with FIG. 6b), since a graphic depiction would not otherwise be possible. Current iR depicted in FIG. 7b) is depicted for an optimum setting in which current i1 in strand 26 has already, before time t1, been largely converted into mechanical energy by current looping and has thus gone to zero, i.e. the magnetic energy decreases, and the mechanical energy conversely increases. Only a minimal current iR therefore flows into capacitor 46. Another way of expressing this is that such a motor has a very low reactive current requirement.

FIG. 7c) shows voltage uR at measuring resistor 59. Whereas in FIG. 6c) a large negative voltage peak 70 occurs, it is completely absent in FIG. 7c) because, even before time t1, magnetic energy W in strand 26 had been largely converted into mechanical energy. This makes it possible to use a very small capacitor 48 that usually has a very long service life, so that a long service life can be guaranteed for such a motor.

Optimizing Commutation

If recharge current iR is to be minimized, it must first be measured. This is achieved using the A/D converter present in the μC. Recharge current iR is measured via measuring resistor 59 at a point in time exactly after commutation, i.e. after time t1, since it is precisely then that the entire recharge current becomes measurable. If the current in strand 26 has not been completely used up by current looping, it flows briefly through resistor 59 and through the two transistors switched on at that moment, e.g. T2 and T3, into capacitor 48. When this current has decayed, the current in the direction that is actually desired builds up again, and can generate a torque on rotor 28.

Recharged current iR is very easy to recognize in FIG. 6b) since, in this case, no current looping was carried out before commutation. The shape of winding current i1 in FIG. 3b), that occurs before commutation, occurs in the opposite direction and ensures a high level of recharged current iR into capacitor 48.

This current iR is much lower in the case of a commutation with current looping (FIGS. 6 and 7). Recharged current iR that flows into capacitor 48 is measurable at measuring resistor 59 as a negative voltage; this is evident from FIG. 6c), from negative voltage peak 70 therein, and from the associated text.

Adapting the Current Looping Time CC

Once the current iR recharged into capacitor 48 has been measured via resistor 59, current looping time CC is increased or decreased in order to make the recharge current even smaller at the next commutation. This is achieved using timer 73 in μC 36. Two problems that arise in this context are that voltage uR at measuring resistor 59, which voltage is generated by recharge current iR, can become negative, regardless of whether the current looping time CC selected was too long or too short. This is readily apparent from FIG. 6c) (commutation without current looping). FIG. 6b) depicts current iR at capacitor 48, FIG. 6c) depicts voltage uR, and FIG. 5 depicts the current in strand 26. The recharged current is visible as a negative voltage peak 70.

The simulations according to FIGS. 6 and 7 simulated the same situation, but with current looping. It is evident that negative voltage peak 70 (FIG. 6c) of voltage uR has disappeared in the simulation according to FIG. 7, since at time t1 the winding current had already decayed by current looping. An additional conclusion that can be gleaned from FIG. 7c) is made evident by observing voltage uR during the current looping time. This voltage uR has a value of zero since, during that time, no motor current is flowing through measuring resistor 59.

Elevating the Voltage Measured at Resistor 59 in a Positive Direction

To solve the first problem (negative voltage uR at resistor 59), that voltage is elevated by a positive offset, by means of voltage divider 67, 68, sufficiently that it is positive at all times, and especially at the time of recharge into capacitor 48. This ensures that recharge current iR can be sensed, i.e. digitized, with the aid of A/D converter 66 in µC 36. This was explained in FIGS. 1 and 9.

Sensing the Zero Point of Voltage uR

For more accurate measurement, the zero point of the voltage at resistor 59, i.e. when no current iR is flowing from or to the motor through resistor 59, is sensed. This sensing occurs during current looping time CC, during which the current in lower branch 56 of H bridge 22 ideally decays to zero, before commutation occurs. As mentioned, the voltage at resistor 59 would have a value of zero volts at this time but, as a result of the actions for potential shifting, has the offset voltage of voltage divider 67, 68 that is required to make the voltage at resistor 59 measurable by the A/D converter. As a result, the zero point does not need to be stipulated in software. Nothing in the software needs to be changed if voltage divider 67, 68 is dimensioned differently, since the zero point, i.e. voltage Uzero, is sensed automatically and the motor is recalibrated. Protection is also provided in this manner against tolerance problems or manufacturing variances in resistors 67, 68, for example as a result of temperature changes.

Software Algorithm for Determining Whether Current Looping Time CC is Too Long or Too Short The second problem is that if current looping time CC is not adjusted optimally, the voltage at measuring resistor 59 is always negative, regardless of whether the current looping time is too short or too long, i.e. it is not possible to infer from the value uR whether CC is too long or too short. This can, however, be ascertained indirectly software algorithm 200 of FIG. 8. This is described below.

Algorithm Flowchart

Step S180 checks whether motor 20 is in range CC (e.g. FIG. 4 or FIG. 5), i.e. whether loop current I* is switched ON. If No, the routine goes back to the beginning. If Yes, then in the next step S182 (GET Uzero), the digital value Uzero is measured and stored.

Step S184 (COM) then checks whether a commutation has been initiated, i.e. a change in the direction of current in winding strand 26. For high-powered motors, commutation usually is not controlled directly by the HALL signal; instead, a time (which is shorter than time duration d in FIG. 4a or 5a) since the previous change in the HALL signal is measured, and commutation occurs after that time duration has elapsed, i.e. one of the two lower semiconductor switches S3, S4 is made nonconductive, and the associated upper semiconductor switch S1 or S2 is made conductive. When this is the case, then in step S186 the instantaneous voltage u67 is measured and stored.

Step S202 then checks whether u67=Uzero. If Yes, then the control system is in an optimized state and the routine consequently goes directly back to step S180, where execution waits for the next CC (current looping) time span.

If the response in S202 is No, a difference voltage Udif is calculated in the next step S204 using the formula $$U\text{dif} = u67 - U\text{zero} \quad (5).$$

A high Udif value means that the commutation is in a far from optimum state, and that a large time correction $\Delta T$ is therefore necessary.

In the next step S206, the magnitude of correction $\Delta T$ is determined as a function of the magnitude of Udif, for example using the formula $$\Delta T = a \cdot U\text{dif} \quad (6),$$

in which a is a constant. For an experimental motor, the result of the calculated correction was in the range from 1 to 50 microseconds.

Another alternative possibility is to calculate using different formulas, or in such a way that, for example, small values of Udif are assigned a $\Delta T$ of 1 microsecond, moderate values a $\Delta T$ of 10 microseconds, and high values a $\Delta T$ of 50 microseconds. It is desirable in general, in the interest of fast control, that if values of Udif are large, large values of $\Delta T$ also be used, since otherwise the control system becomes slow. A control approach in which a value $\Delta T$=constant is used for any value of Udif deviating from zero is, however, also not precluded.

Routine 200 begins again after each commutation.

Voltage Uzero is thus measured during time span CC, since during this time no current is flowing through resistor 59 and consequently the voltage Uzero at resistor 67 corresponds to the actual current iR=0. Voltage Uzero at input 66a has a positive value because of the potential shift in the positive direction, because A/D converter in microcontroller 36 can process only positive values and because the actual voltage uR (as described in FIG. 6c) can also become negative. This measurement has the advantage that the arrangement is constantly calibrating itself, for example in the event of a change in the value of resistors 67, 68.

As already explained, the problem exists that if time T is set inaccurately, the actual voltage uR is always negative regardless of whether T is too short or too long, so that the polarity of uR does not indicate the direction in which time t2 (FIG. 4) should be shifted.

A determination must then be made as to whether the value T is to be lowered or raised by the value $\Delta T$. S208 therefore ascertains whether the recharged current has increased or decreased as compared with the last measurement. The old difference voltage Udif from the previous measurement was stored in a variable Udif_old and is compared with the value Udif just ascertained. If recharged current iR has become smaller, i.e. if the response in S208 is Yes, then the last correction action was carried out in the correct direction, and it is therefore repeated in the same direction so that the recharge current becomes even lower. If the recharge current has become larger, however, then the last correction action was going in the wrong direction, and the new action must happen in the opposite direction.

If it is therefore determined in S208 that Udif has decreased, S210 therefore checks whether the time span T=d−c' was increased in the last control operation. If Yes, that action is repeated in S212, i.e. time span T is once again increased, so that second point in time t2 is brought closer to time t1 at which commutation occurs as a result of the signal of sensor 30.

If, on the other hand, it is found in S210 that time span T was decreased in the context of the previous control operation, the next step S214 then once again decreases time span T.

If it is determined in step S208 that voltage Udif has increased—which means that the result of the previous pass was to make matters worse (or at least not better)—S216 then checks whether time T was decreased in the context of the previous control pass. This action then must not be repeated, and in step S218 time T is therefore increased by ΔT; and if it is found in S216 that time T was increased in the context of the last action, it is decreased by ΔT in the next step S220.

Following steps S212, S214, S218, and S220, in step S222 timer 73 in μC 36 is then loaded with the modified value T, and the value Udif_old is replaced by the new value Udif.

At the next commutation operation, algorithm 200 is then run through again. It is also optionally possible to run through the algorithm, or parts of it, less often, for example only after every ten or every 100 commutations.

S202 thus checks at time t1 whether a negative current pulse is being measured at measuring resistor 59. If that is not the case, i.e. if the response in S202 is Yes, i.e. current looping time CC is set correctly, then no change is made and the routine goes directly to step S222, where the value Udif is stored in timer 73 in place of the previous value Udif_old.

If the response in S202 is No, then the value of current looping time CC is not optimal and it is therefore modified. Firstly, therefore, in step S204 the difference voltage Udif is ascertained. This is the difference with respect to characteristic voltage Uzero (explained in FIG. 9) which is ascertained, for example, when loop current I* is flowing in winding strand 26. The variable Udif is an indication of how whether time span CC is way off or slightly off, i.e. very wrong or less wrong. Step S206 then defines ΔT as a function of the level of the negative current peak at measuring resistor 59.

At this point in time, however, it is not yet known whether current looping time CC needs to be increased or decreased. This is a consequence of the fact that the negative current pulse at measuring resistor 59 occurs in the same manner if current looping time C is set too low or set too high.

S208 therefore checks whether the negative current pulse is smaller than at the previous measurement. If so, the correction action in the context of the measurement made previously was correct, and that correction action (increase CC or decrease CC) must be repeated. Step S210 checks which action was carried out previously, and that action is then carried out again in S212 or S214.

S216 deals with the case in which the value Udif that was ascertained in S204 has gotten worse as compared with the measurement made previously, i.e. the correction action that was carried out previously was wrong, and exactly the opposite now needs to be done. So if the last action was a decrease in the value of CC (S216=Yes), the current looping time CC is then increased by the value ΔT. If the last action was to increase current looping time CC, however, i.e. if the response in step S216 was No, current looping time CC must then be decreased by the value ΔT. In this manner, current looping time CC gets closer and closer to the correct value that is optimal for operating conditions at that instant.

If the operating conditions change, correction algorithm 200 goes into operation again and current looping time CC is adapted to those new operating conditions. The correction action may not result in an improvement toward the minimum for each single step, e.g. in conditions near the minimum or during a change of operating conditions, but it will result in an improvement toward the minimum in a majority of the steps.

In FIG. 8, steps S212, S214, S218, and S220 are followed by step S222, which has already been described.

In the event of a change in load or a change in operating voltage UB, the current profile thus gradually adapts to the new operating conditions. This process can be observed very easily on an oscilloscope by watching the current trace. The process is carried out slowly so as not to cause any current asymmetries due to rapid load changes. In practice, one or two minutes may elapse until the value of time T has been optimally adjusted. Optimization of the current looping time CC also increases the rotation speed and efficiency as adaptive control takes place.

It is very advantageous that only a minimum of additional circuit hardware is required if a microcontroller is used, since only resistors 67 and 68 are then needed, while the rest is handled by the short additional program routine 200 in the microcontroller. A motor having improved properties is thus obtained with minimal additional outlay.

Numerous variants and modifications are of course possible, within the scope of the present invention.

What is claimed is:

1. An electronically commutated motor (20) comprising:
a rotor (28) and
a rotor position sensor (30) associated therewith, which sensor, during operation, furnishes a rotational position signal (34), at least at predetermined rotational positions of the rotor (28),
a stator interacting with the rotor (28), said stator having at least one stator winding strand (26) that is arranged in the diagonal (24) of
an H bridge (22), the H bridge including
a first semiconductor switch (S3), a first connection of said first semiconductor switch (S3) being connected to a first side (52) of the winding strand (26), a second connection of said first semiconductor switch (S3) being connected to a connecting lead (62), the H bridge also comprising
a second semiconductor switch (S4), a first connection of said second semiconductor switch (S4) being connected to a second side (54) of the winding strand (26), a second connection of said second semiconductor switch (S4) being connected to said connecting lead (62),
wherein the H bridge (22) is configured on a first side (44) for connection to a first pole (46) of a DC voltage source, and is configured at the connecting lead (62) for connection to a second pole (50) of said DC voltage source,
the connecting lead (62) being connected via a measuring resistor (59) to the second pole (50), through which measuring resistor (59) a current (iR) flows to the H bridge (22), during operation, and thereby causes a corresponding voltage drop (uR) in the measuring resistor (59), and
a control apparatus (36) which, during operation, performs the steps of:
measuring a current-dependent signal (u67) that is derived from said voltage drop (uR) at said measuring resistor (59),
controlling the H bridge (22) so that the stator winding strand (26) associated therewith has current pulses (+i1, −i1) flowing through it, between which pulses, adjacent a first point in time (t1) that is influenced by a rotational position signal (34) of the rotor position sensor (30), the flow direction, of the current delivered to the stator winding strand (26), is switched over by a commutation operation to a direction opposite to the previous current flow direction;
starting from a second point in time (t2) which is in advance of said first point in time (t1), operating the stator winding strand (26) in short circuit, by corresponding control of the H bridge (22), in order to cause a decreasing loop current (I*) through the stator winding strand (26); and performing modification steps of the second point in time (t2), as a function of said current-dependent signal (u67), in order to modify the current (i1, i1') flowing in the winding strand (26) at a first point in time (t1), toward a minimum.

2. The motor according to claim 1, further comprising:
in the control apparatus (36), controlling the direction of a modification step, as a function of the result of at least one preceding modification step.

3. The motor according to claim 1, further comprising,
in the H bridge (22),
at least one recovery diode (58, 60), through which, during operation, said decreasing loop current (I*) flows.

4. The motor according to claim 1, wherein the first side (44) of the H bridge (22) is connected to a capacitor (48) referred to hereinafter as a link circuit capacitor, and,
during operation, a reciprocating current flows between the stator winding strand (26) and the link circuit capacitor (48), and the magnitude of said reciprocating current is modified toward a minimum, as a function of the level of a current (iR) flowing through the measuring resistor (59) in the context of the commutation operation.

5. The motor according to claim 1, wherein the control apparatus (36) has associated therewith
an analog-to-digital (A/D) converter (66) for digitizing said current-dependent signal (u67) that is derived from the voltage drop (uR) at said measuring resistor (59).

6. The motor according to claim 5, wherein the input of the A/D converter (66) has, associated therewith, an arrangement (63, 67, 68) for shifting the potential of the input signal of the A/D converter (66), by means of which arrangement all values of said input signal that occur during operation are shiftable into regions having a polarity enabling a digitization, by the A/D converter (66), of the signal (u67) applied thereto.

7. The motor according to claim 5, further comprising
a low-pass filter (63, 64), located between the measuring resistor (59) and the A/D converter (66).

8. The motor according to claim 6, wherein a network of resistors (63, 67, 68) is provided for potential shifting, which network is connected to a DC voltage potential (+VCC) in the direction of which the potential shift is desired.

9. The motor according to claim 6, wherein the arrangement (63, 67, 68) for potential shifting causes, during operation, a characteristic voltage value (Uzero) at the input (66a) of the A/D converter (66), which characteristic value is obtained when a loop current (I*) is flowing in the motor (20).

10. The motor according to claim 9, wherein
the control apparatus is configured to check, when a signal value (u67) deviating from the characteristic value (Uzero) is present, whether the difference (Udif) between the characteristic value (Uzero) and the present value (u67) has been made greater or smaller by a modification step performed there, and
when a greater difference (Udif) exists, to carry out a modification step opposite to the modification step performed there, in order to reduce the difference (Udif).

11. The motor according to claim 9, wherein
the control apparatus (36) is configured to check, when a present value (u67) deviating from the characteristic value (Uzero) is present, whether the difference (Udif) between the characteristic value (Uzero) and the present value (u67) has been made greater or smaller by a previous modification step, and
when a smaller difference (Udif) exists, to carry out another modification step analogous to the modification step performed there.

12. The motor according to claim 1, wherein the current-dependent signal (u67) assumes, while the loop current (I*) is flowing, a characteristic value (Uzero) that indicates the absence of a current through the measuring resistor (59), a deviation of the current-dependent signal (u67) from said characteristic value (Uzero) indicating the end of a loop current (I*) that was previously flowing.

13. The motor according to claim 1, wherein
the control apparatus (36) is so configured that it is activatable by a commutation operation.

14. The motor according to claim 1, which is configured for driving a fan.

15. The motor according to claim 1, wherein said control apparatus (36) comprises a FLASH-based microcontroller with an integrated analog-to-digital converter (66).

16. The motor according to claim 1, wherein said current (i1, i1') flowing in the winding strand (26) at the first point in time (t1) is estimated by measuring the current-dependent signal (u67), in the context of the commutation operation, at said first point in time (t1).

17. The motor according to claim 1, wherein said current (i1, i1') flowing in the winding strand (26) at the first point in time (t1) is estimated by measuring the current-dependent signal (u67) at a point in time after commutation at the first point in time (t1).

18. An electronically commutated motor (20) comprising:
a rotor (28) and a rotor position sensor (30) associated therewith, which sensor, during operation, furnishes a rotational position signal (34), at least at predetermined rotational positions of the rotor (28),
a stator interacting with the rotor (28), which stator has at least one stator winding strand (26) that is arranged in the diagonal (24) of an H bridge (22),
wherein the H bridge (22) is configured on a first side (44) for connection to a first pole (46) of a DC voltage source, and is configured on a second side (62) for connection to a second pole (50) of said DC voltage source,
the second side (62) being connected via a measuring resistor (59) to the second pole (50), through which measuring resistor (59) a current (iR) flows during operation to the H bridge (22), thereby causing a corresponding voltage drop (uR) in the measuring resistor (59),
an analog-to-digital (A/D) converter (66) for digitizing a current-dependent signal (u67) that is derived from the voltage drop (uR) at said measuring resistor (59),
the input of the A/D converter (66) having, associated therewith, an arrangement (63, 67, 68) for shifting the potential of the input signal of the A/D converter (66), by means of which arrangement all values of said input signal that occur during operation are shiftable into regions having a polarity enabling a digitization, by the A/D converter (66), of the signal (u67) applied thereto, and a control apparatus (36) which, during operation, performs the steps of:
controlling the H bridge (22) so that the stator winding strand (26) associated therewith has current pulses (+i1, −i1) flowing through it, between which pulses, adjacent a first point in time (t1) that is influenced by a rotational position signal (34) of the rotor position sensor (30), the flow direction of the current delivered to the stator winding strand (26) is switched over by a commutation operation to a direction opposite to the previous current flow direction;
at the beginning of each commutation operation, starting from a second point in time (t2), operating in short circuit the stator winding strand (26), arranged in the diagonal of the H bridge (22), by corresponding control of the H bridge (22), in order to cause a decreasing loop current (I*) through the stator winding strand (26), which loop current (I*) reaches a value of zero at a third point in time (t3);

measuring a current-dependent signal (u67) that is derived from the voltage drop (uR) at said measuring resistor (59), and performing modification steps as a function of said current-dependent signal (u67), in order to modify, toward a minimum, the time interval (TCC) between the first point in time (t1) and the third point in time (t3).

19. The motor according to claim 18, wherein a network of resistors (63, 67, 68) is provided for potential shifting, which network is connected to a DC voltage potential (+VCC) in the direction of which the potential shift is desired.

20. The motor according to claim 18, wherein the arrangement (63, 67, 68) for potential shifting causes, during operation, a characteristic voltage value (Uzero) at the input (66*a*) of the A/D converter (66), which characteristic value is obtained when a loop current (I*) is flowing in the motor (20).

21. The motor according to claim 20, wherein the control apparatus is configured to check, when a signal value (u67) deviating from the characteristic value (Uzero) is present, whether the difference (Udif) between the characteristic value (Uzero) and the present value (u67) has been made greater or smaller by a modification step performed there, and when a greater difference (Udif) exists, to carry out a modification step opposite to the modification step performed there, in order to reduce the difference (Udif).

22. The motor according to claim 20, wherein the control apparatus (36) is configured to check, when a present value (u67) deviating from the characteristic value (Uzero) is present, whether the difference (Udif) between the characteristic value (Uzero) and the present value (u67) has been made greater or smaller by a previous modification step, and when a smaller difference (Udif) exists, to carry out another modification step analogous to the modification step performed there.

* * * * *